United States Patent
Yuan et al.

(10) Patent No.: US 11,659,285 B2
(45) Date of Patent: May 23, 2023

(54) MONITORING DEVICE AND IMAGE CAPTURING METHOD

(71) Applicant: CHICONY ELECTRONICS CO., LTD., New Taipei (TW)

(72) Inventors: Shang-Yuan Yuan, New Taipei (TW); Chia-Hsing Kuo, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 44 days.

(21) Appl. No.: 17/116,546

(22) Filed: Dec. 9, 2020

(65) Prior Publication Data
US 2021/0250485 A1 Aug. 12, 2021

(30) Foreign Application Priority Data
Feb. 11, 2020 (TW) .................................. 109104261

(51) Int. Cl.
*H04N 23/73* (2023.01)
*H04N 7/18* (2006.01)
*H04N 23/70* (2023.01)

(52) U.S. Cl.
CPC ............. *H04N 23/73* (2023.01); *H04N 7/18* (2013.01); *H04N 23/70* (2023.01)

(58) Field of Classification Search
CPC ......... H04N 5/235; H04N 5/2353; H04N 7/18
USPC ........................................................ 348/143
See application file for complete search history.

(56) References Cited

U.S. PATENT DOCUMENTS

| 2016/0105644 A1* | 4/2016 | Smith .................. G08B 29/185 |
| | | 348/159 |
| 2017/0085800 A1* | 3/2017 | Wang ................. H04N 5/23293 |

FOREIGN PATENT DOCUMENTS

| CN | 104994277 B | 10/2018 |
| TW | I536827 B | 6/2016 |

* cited by examiner

*Primary Examiner* — On S Mung
(74) *Attorney, Agent, or Firm* — Muncy, Geissler, Olds & Lowe, P.C.

(57) ABSTRACT

A monitoring device includes an image capturing module, a photosensitive element, a first processing module and a second processing module. The photosensitive element obtains a lighting parameter of a monitored environment. The first processing module is electrically connected to the photosensitive element, stores the lighting parameter, and continuously updates the lighting parameter. The second processing module is electrically connected to the image capturing module and the first processing module, and the second processing module has a sleep mode. The second processing module includes an exposure function control unit. When the second processing module is awakened and converted to a recording mode, the exposure function control unit receives the updated lighting parameter from the first processing module and calculates an exposure parameter according to the lighting parameter to control the image capturing module.

9 Claims, 5 Drawing Sheets

MONITORING DEVICE AND IMAGE CAPTURING METHOD

BACKGROUND APPLICATION

1. Technical Field

The present disclosure relates to a monitoring device and an image capturing method.

2. Description of the Related Art

With people paying more attention to the quality and safety of the public living environment, they are also more concerned about whether there are unmonitored spaces in the surrounding environment. At present, the monitoring device is used to reduce the number of unmonitored spaces in public or private places. In general, a monitoring device has the function of video recording (image capturing), which uses high power consumption components such as an image sensor (e.g. a charge-coupled device (CCD) or a complementary metal-oxide-semiconductor (CMOS)) and a digital signal processor (DSP). Therefore, the general monitoring device is also a high power consumption device. For wireless monitoring devices that rely on battery power, the high power consumption is an urgent issue. The current (wireless) monitoring devices are designed to enter a sleep mode during which the camera is not used for a certain period of time (e.g. 1 to 10 minutes) to save power. When a user needs to use the recording function, the user can wake up the monitoring device by pressing certain keys or sending a start signal. The monitoring device can also be awakened by a motion sensor when it detects a moving object.

In general, the monitoring device is equipped with an ambient light sensor and an automatic exposure control (AEC) module. After the ambient light sensor measures the amount of ambient light, the automatic exposure control module calculates a proper exposure parameter to control the appropriate exposure time and obtain a proper image. However, after the monitoring device is awakened, the automatic exposure control module has to receive the amount of light from the ambient light sensor and then spend a period time for exposure convergence (that is, calculating the proper exposure parameter). This period of time can cause an inappropriate exposure of the image or insufficiently fast recording of the video. Accordingly, there is a need for improvement.

SUMMARY

In view of the above problems, the main object of the present disclosure is to provide a monitoring device and an image capturing method, wherein a first processing module is able to update a lighting parameter continuously or a second processing module is awakened at regular intervals to update a exposure parameter, thereby solving the problem that a conventional monitoring device cannot obtain a proper image without a delay after being awakened.

In order to achieve the above object, the present disclosure provides a monitoring device, which comprises an image capturing module, a photosensitive element, a first processing module and a second processing module. The photosensitive element obtains a lighting parameter of a monitored environment. The first processing module is electrically connected to the photosensitive element, stores the lighting parameter and continuously updates the lighting parameter. The second processing module is electrically connected to the image capturing module and the first processing module, and the second processing module has a sleep mode. The second processing module comprises an exposure function control unit. When the second processing module is awakened and converted to a recording mode, the exposure function control unit receives the updated lighting parameter from the first processing module and calculates an exposure parameter according to the lighting parameter to control the image capturing module.

According to an embodiment of the present application, the monitoring device further comprises an awakening module, which is electrically connected to the second processing module. The awakening module transmits a work signal to the second processing module so that the second processing module is converted to the recording mode, and the image capturing module captures an image of the monitored environment.

According to an embodiment of the present application, the awakening module comprises a wireless communication module or a motion sensor.

According to an embodiment of the present application, the second processing module further comprises a timed awakening unit; the second processing module in the sleep mode is awakened by the timed awakening unit at regular intervals so that the exposure function control unit can calculate and update the exposure parameter according to the lighting parameter.

According to an embodiment of the present application, when the second processing module is awakened and converted to a recording mode, the exposure function control unit controls the image capturing module according to the updated exposure parameter.

In order to achieve the above object, the present disclosure provides an image capturing method, which is applied in a monitoring device. The monitoring device comprises an image capturing module, a photosensitive element, a first processing module and a second processing module. The second processing module has a sleep mode and comprises an exposure function control unit. The image capturing method comprises the following steps: the photosensitive element obtaining a lighting parameter of a monitored environment; the first processing module storing the lighting parameter and continuously updating the lighting parameter; the second processing module being awakened and converted to a recording mode; the exposure function control unit receiving the updated lighting parameter from the first processing module and calculating an exposure parameter according to the lighting parameter to control the image capturing module.

According to an embodiment of the present application, the monitoring device further comprises an awakening module transmitting a work signal to the second processing module to convert the second processing module to the recording mode. The image capturing method further comprises the following step: the image capturing module capturing an image of the monitored environment.

According to an embodiment of the present application, the second processing module further comprises a timed awakening unit. The image capturing method further comprises the following steps: the second processing module in the sleep mode being awakened by the timed awakening unit at regular intervals, and the exposure function control unit calculating and updating the exposure parameter according to the lighting parameter.

According to an embodiment of the present application, when the second processing module is awakened and converted to a recording mode, the image capturing method comprises the following step: the exposure function control unit controlling the image capturing module according to the updated exposure parameter.

In order to achieve the above object, the present disclosure further provides a monitoring device, which comprises an image capturing module, a photosensitive element and a second processing module. The photosensitive element obtains a lighting parameter of a monitored environment. The second processing module is electrically connected to the photosensitive element and the image capturing module, and the second processing module has a sleep mode. The second processing module comprises a timed awakening unit and an exposure function control unit. The second processing module in the sleep mode is awakened by the timed awakening unit at regular intervals. When the second processing module is awakened by the timed awakening unit, the exposure function control unit calculates and updates an exposure parameter according to the lighting parameter. When the second processing module is awakened and converted to a recording mode, the exposure function control unit controls the image capturing module according to the updated exposure parameter.

According to an embodiment of the present application, the monitoring device further comprises an awakening module, which is electrically connected to the second processing module. The awakening module transmits a work signal to the second processing module so that the second processing module is converted to the recording mode, and the image capturing module captures an image of the monitored environment.

In order to achieve the above object, the present disclosure further provides an image capturing method, which is applied in a monitoring device comprising an image capturing module, a photosensitive element and a second processing module. The second processing module has a sleep mode and comprises a timed awakening unit and an exposure function control unit. The image capturing method comprises the following steps: the photosensitive element obtaining a lighting parameter of a monitored environment: the second processing module in the sleep mode being awakened by the timed awakening unit at regular intervals: the exposure function control unit calculating and updating an exposure parameter according to the lighting parameter: the second processing module being awakened and converted to a recording mode: and the exposure function control unit controlling the image capturing module according to the updated exposure parameter.

According to an embodiment of the present application, the monitoring device further comprises an awakening module transmitting a work signal to the second processing module such that the second processing module is converted to the recording mode. The image capturing method comprises the following step: the image capturing module capturing an image of the monitored environment.

As described above, according to the monitoring devices and the image capturing methods of the present disclosure, when the second processing module is in the sleep mode, then since the first processing module is electrically connected to the photosensitive element, the lighting parameter can be continuously updated by the first processing module. When the second processing module is awakened by an external trigger, it can directly use the updated lighting parameter to calculate the exposure parameter, so the image capturing module can obtain a proper image without a delay. Alternatively, the second processing module in the sleep mode is periodically awakened to update the exposure parameter. Therefore, when the second processing module is awakened by an external trigger, the updated exposure parameter can be directly used, which also allows the image capturing module to obtain a proper image without a delay.

DETAILED DESCRIPTION OF THE PREFERRED EMBODIMENT

In order to make the structure and characteristics as well as the effectiveness of the present disclosure further understood and recognized, a detailed description of the present disclosure is provided as follows, along with embodiments and accompanying figures.

Figure 1:
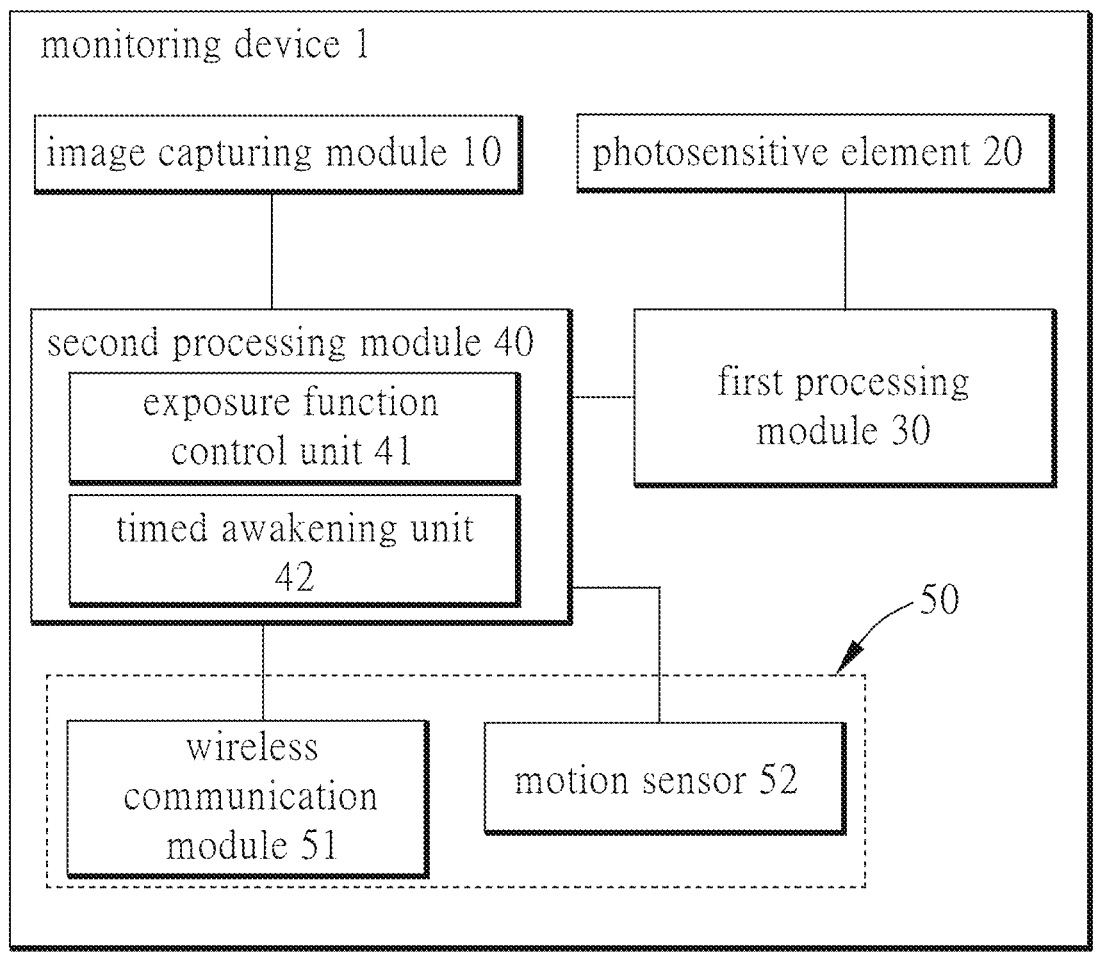
FIG. 1 is a block diagram of a monitoring device according to a first embodiment of the present disclosure.

Please refer to FIG. 1. FIG. 1 is a block diagram of a monitoring device according to a first embodiment of the present disclosure. In this embodiment, the monitoring device 1 comprises an image capturing module 10, a photosensitive element 20, a first processing module 30 and a second processing module 40. The image capturing module 10 might include components for capturing images or recording video, such as a lens and an image sensor. The photosensitive element 20 is a component for detecting the ambient light, which may be but is not limited to an ambient light sensor (ALS). The monitoring device 1 of this embodiment includes two processors, which are called the first processing module 30 and the second processing module 40. The first processing module 30 is mainly used for controlling peripheral components and is designed to be an uninterrupted component. In this embodiment, a micro control unit (MCU) is used as an example. The second processing module 40 is mainly used for image processing and may be but is not limited to a digital signal processor (DSP) or a central processing unit (CPU). In this embodiment, the digital signal processor (DSP) is used as an example.

In this embodiment, the first processing module 30 is electrically connected to the photosensitive element 20, and the second processing module 40 is electrically connected to the image capturing module 10 and the first processing module 30 to receive relevant parameters or signals or to perform other functions. Specifically, the monitoring device 1 of this embodiment is based on a wireless monitoring device as an example. To save power, the second processing module 40 for the image processing has a sleep mode, which can be set to be activated when the video recording function or other image capturing function is not used within a predetermined duration (e.g. 1 to 10 minutes). In addition, the monitoring device 1 further comprises an awakening module 50, which is electrically connected to the second processing module 40. When the video recording function or other image capturing function is required, the awakening module 50 transmits a work signal to the second processing module 40 so that the second processing module 40 is converted to a recording mode. Since the first processing module 30 is an uninterrupted component, it can be used to instantly wake up the second processing module 40. Further details are explained below.

It should be noted that each of the aforementioned modules can be configured as hardware devices, software programs, firmware, or a combination thereof and can also be configured as circuit loops or other appropriate types. The modules are connected to each other in a wired or wireless manner to receive and transmit data. Further, each module can be configured separately or combined. A preferred embodiment is that the modules are software programs stored in a storage unit, and each of the modules is executed by the first processing module 30 or the second processing module 40 to achieve the functions of the present disclosure. In addition, this embodiment only exemplifies preferred embodiments of the present disclosure and does not describe all possible combinations to avoid redundant descriptions. However, those of ordinary skill in the art should understand that the aforementioned modules or components are not all necessary. In order to implement the goal of the present disclosure, other more detailed conventional modules or components may also be included. Each of the modules or components may be omitted or modified as required, and there may be other modules or components between any two modules.

Figure 2:
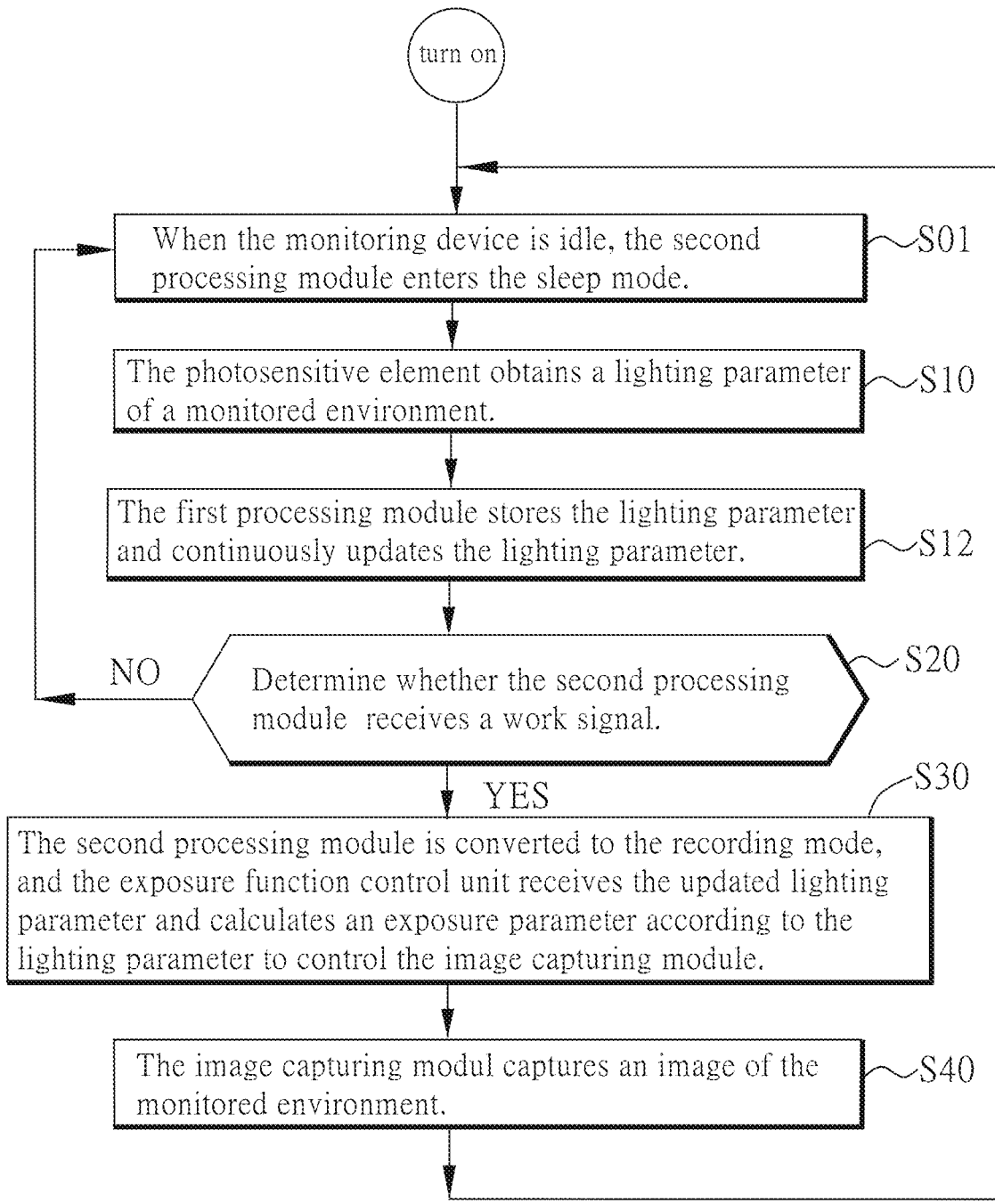
FIG. 2 is a flow chart of an image capturing method according to the first embodiment of the present disclosure.

For instance, an image capturing method may be stored in the storage unit and be applied in the monitoring device 1; that is, the method can be executed by each module of the monitoring device. FIG. 2 is a flow chart of an image capturing method according to the first embodiment of the present disclosure. Please refer to FIG. 1 and FIG. 2. The following describes the operation of the modules with the steps of the image capturing method.

Step S01: When the monitoring device 1 is idle, the second processing module 40 enters the sleep mode.

As mentioned above, to save power, the monitoring device 1 is set to enter the sleep mode if the video recording function or other image capturing function is not used (i.e. is in an idle state) within a predetermined duration (e.g. 1 to 10 minutes). In the sleep mode, the following steps S10 and S12 are still performed.

Step S10: The photosensitive element 20 obtains a lighting parameter of a monitored environment.

The photosensitive element 20 obtains the lighting parameter of the position (monitored environment) where the monitoring device 1 is installed; that is, it obtains the amount of ambient light.

Step S12: The first processing module 30 stores the lighting parameter and continuously updates the lighting parameter.

In this embodiment, the first processing module 30 is electrically connected to the photosensitive element 20 such that the first processing module 30 can receive the lighting parameter from the photosensitive element 20, and the lighting parameter is stored in the storage unit. In some embodiments, the first processing module 30 may control the photosensitive element 20 to obtain the lighting parameter of the monitored environment at a specific time (or when required). For example, the first processing module 30 may transmit a signal to the photosensitive element 20 every 1 second so as to cause the photosensitive element 20 detecting the amount of ambient light to obtain the lighting parameter. In some embodiments, the photosensitive element 20 may be set to automatically detect the amount of ambient light at regular intervals (such as every 1 second) to obtain the lighting parameter of the monitored environment.

Further, the first processing module 30 directly receives the lighting parameter from the photosensitive element 20 and stores the lighting parameter. The first processing module 30 receives the latest lighting parameter (at the latest time point), which replaces the stored (old) lighting parameter. In other words, the first processing module updates the lighting parameter at regular intervals (1 second) to continuously update the lighting parameter.

In the embodiment in which the photosensitive element 20 automatically detects the amount of ambient light, after the photosensitive element 20 obtains the lighting parameter, the lighting parameter is directly transmitted to the first processing module 30 such that the first processing module 30 continuously receives and updates the lighting parameter.

Step S20: Determine whether the second processing module 40 receives a work signal.

In step S20, the second processing module 40 executes step S30 or returns to step S01 according to whether a work signal is received. Specifically, if the second processing module 40 does not receive a work signal, step S01 is performed; that is, the second processing module 40 remains in the sleep mode. If the second processing module 40 receives a work signal, then step S30 is performed, and the processing module 40 is converted to the recording mode.

The awakening module 50 may be but is not limited to a wireless communication module 51 and/or a motion sensor 52. In this embodiment, the awakening module 50 includes two components, a wireless communication module 51 and a motion sensor 52.

In one embodiment, the wireless communication module 51 communicates with the user's communication device (such as a smart phone or a computer) to receive the signal to activate the video recording function from the communication device. Then the wireless communication module 51 sends a work signal to the second processing module 40 to perform the subsequent steps. In one embodiment, when the motion sensor 52 detects an object moving in the monitored environment (video monitoring is required), the motion sensor 52 transmits a work signal to the second processing module 40 to perform the subsequent steps.

Step S30: The second processing module 40 is converted to the recording mode, and the exposure function control unit 41 receives the updated lighting parameter from the first processing module 30 and calculates an exposure parameter according to the lighting parameter to control the image capturing module 10.

In this embodiment, the second processing module 40 is electrically connected to the image capturing module 10 and the first processing module 30 such that the second processing module 40 can receive the updated lighting parameter from the first processing module and calculate the exposure parameter. Then the second processing module 40 can control the components of the image capturing module 10, such as a lens and an aperture, an image sensor, or a flash light, according to the exposure parameter to perform video recording or other image capturing functions.

Specifically, the second processing module 40 comprises an exposure function control unit 41, which may be an automatic exposure controller (AEC). When the second processing module 40 is ready to perform the video recording function, the exposure function control unit 41 calculates an exposure parameter according to the lighting parameter. In this embodiment, when the second processing module 40 is awakened and converted to the recording mode, the exposure function control unit 41 receives the updated lighting parameter from the first processing module 30 and calculates the exposure parameter according to the updated lighting parameter.

Then the exposure function control unit 41 controls the image capturing module 10 according to the exposure parameter. Specifically, the exposure function control unit 41 controls the image capturing module 10 by adjusting the aperture, shutter, or exposure time such that an image with a proper exposure value can be obtained (Step S40).

Step S40: The image capturing module 10 captures an image of the monitored environment.

After the exposure parameter is adjusted to match the ambient light (Step S30), the image capturing module 10 can capture an image with appropriate brightness. Specifically, in this embodiment, when the second processing module 40 is awakened and converted to the recording mode, the exposure function control unit 41 receives the updated lighting parameter from the first processing module 30, calculates the latest exposure parameter according to the updated lighting parameter, and controls the image capturing module 10 (step S30) so that the image capturing module 10 can use the proper exposure parameter to capture an image of the monitored environment (step S40).

Since the first processing module 30 continuously updates the lighting parameter even when the second processing module 40 is in the sleep mode, the second processing module 40 can directly use the updated lighting parameter to calculate the exposure parameter as soon as the second processing module 40 is awakened. Therefore, the image capturing module 10 is able to obtain an appropriate image (that is, an image with proper brightness) without a delay. The conventional monitoring device of the prior art controls the ambient light sensor (such as a photosensitive element 20) to detect the amount of ambient light after being awakened, so a delay occurs before the proper exposure parameter can be obtained. This situation can cause the initial image to be blurred due to an inappropriate exposure parameter, and the monitoring function cannot be achieved. The architecture of the monitoring device 1 and the image capturing method of this embodiment can effectively solve the issues of the prior art.

Figure 3:
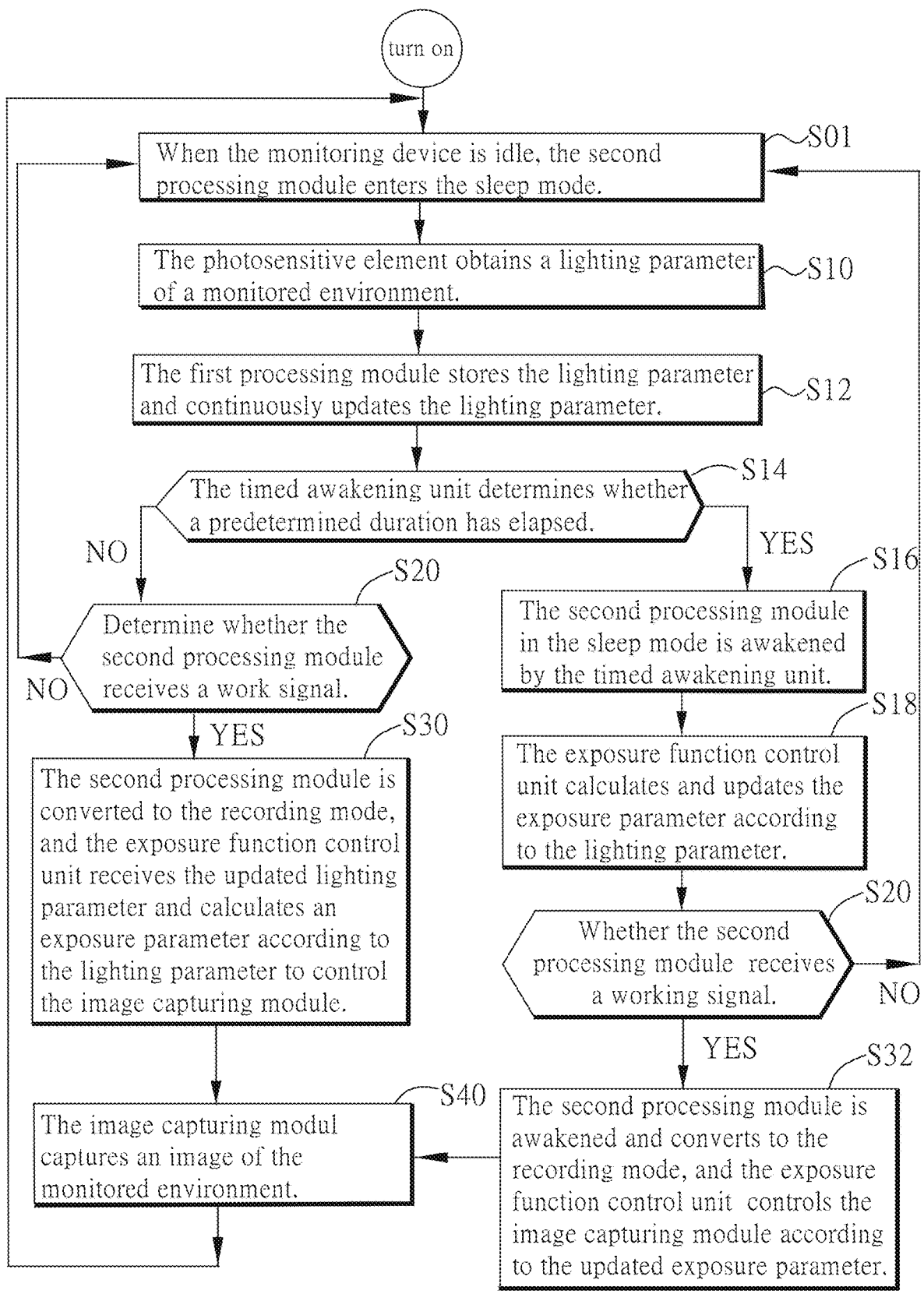
FIG. 3 is a flow chart of an image capturing method according to a second embodiment of the present disclosure.

FIG. 3 is a flow chart of an image capturing method according to a second embodiment of the present disclosure, which is also applied in the monitoring device 1 of the first embodiment. Please refer to FIG. 1 and FIG. 3. The first three steps S01, S10 and S12 of the image capturing method of this (second) embodiment are the same as those steps in the first embodiment, so the details will not be repeated herein. The main difference from the first embodiment is the related operations of the timed awakening unit 42; that is, after step S12, the method proceeds to the determination step of step S14.

Step S14: The timed awakening unit 42 determines whether a predetermined duration has elapsed. If NO, the method proceeds to the determination step of step S20, which is the same as that of the first embodiment and will not be described herein; if YES, the method proceeds to step S16.

Step S16: The second processing module 40 in the sleep mode is awakened by the timed awakening unit 42.

In this embodiment, the second processing module 40 further comprises a timed awakening unit 42, which may be a real-time clock (RTC). Steps S14 and S16 are described herein; the timed awakening unit 42 may be set to wake up the second processing module 40 out of the sleep mode at regular intervals (i.e. after every predetermined duration, such as every 1 minute). In other words, in step S14, the timed awakening unit 42 determines whether the sleep time of the second processing module 40 has reached the aforementioned predetermined duration. If the sleep time has reached the predetermined duration, the method proceeds to step S16; the second processing module 40 in the sleep mode is awakened by the timed awakening unit 42. Then the exposure function control unit 41 updates the exposure parameter according to the lighting parameter (Step S18).

Step S18: The exposure function control unit 41 calculates and updates the exposure parameter according to the lighting parameter.

In Step S18, the second processing module 40 may also obtain the lighting parameter from the first processing module 30, and the exposure function control unit 41 calculates a new exposure parameter according to the lighting parameter to update the previous (old) exposure parameter. The content of the exposure function control unit 41 calculates and obtains the exposure parameter as described in Step S30 of the abovementioned first embodiment, and the details are not repeated herein.

Then if the second processing module 40 receives the work signal (Step S20), the second processing module 40 is awakened and performs step S32.

In other words, in the case of the second processing module 40 being awakened by the timed awakening unit 42, the exposure function control unit 41 only updates the exposure parameter instead of converting the second processing module 40 to the recording mode. After the second processing module 40 receives a work signal from the awakening module 50 (Step S20), the second processing module 40 is converted to the recording mode (Step S32). In other words, the exposure function control unit 41 still periodically updates the exposure parameter without an external trigger (i.e. the awakening module 50 transmitting a work signal).

Step S32: The second processing module 40 is awakened and converts to the recording mode, and the exposure function control unit 41 controls the image capturing module 10 according to the updated exposure parameter. After the second processing module 40 is awakened, the exposure function control unit 41 uses the exposure parameter updated in step S18 to control the image capturing module 10. Similarly, the image capturing module 10 can obtain an appropriate image without a delay because the exposure value has been adjusted rapidly.

Therefore, after the second processing module 40 enters the sleep mode (Step S01), the first processing module 30 still continuously updates the lighting parameter (steps S10 and S12), and the exposure function control unit 41 of the second processing module 40 also periodically updates the exposure parameter (steps S16 and S18). Similarly, the second processing module 40 determines whether a work signal is received (step S20). If the second processing module 40 receives a work signal (an external trigger) from the awakening module 50, the method proceeds to step S30 or step S32 and the second processing module 40 is converted to the recording mode.

Figure 4:
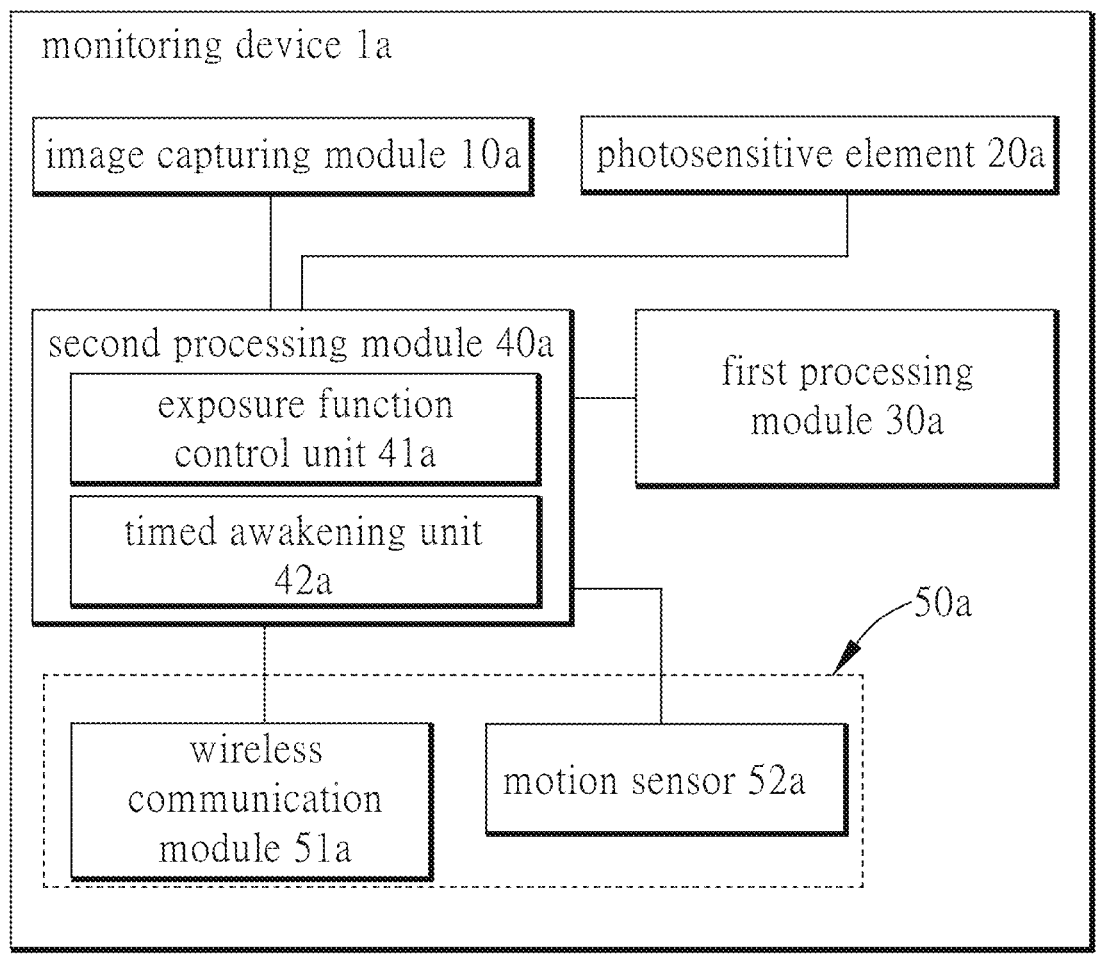
FIG. 4 is a block diagram of a monitoring device according to the second embodiment of the present disclosure.
Figure 5:
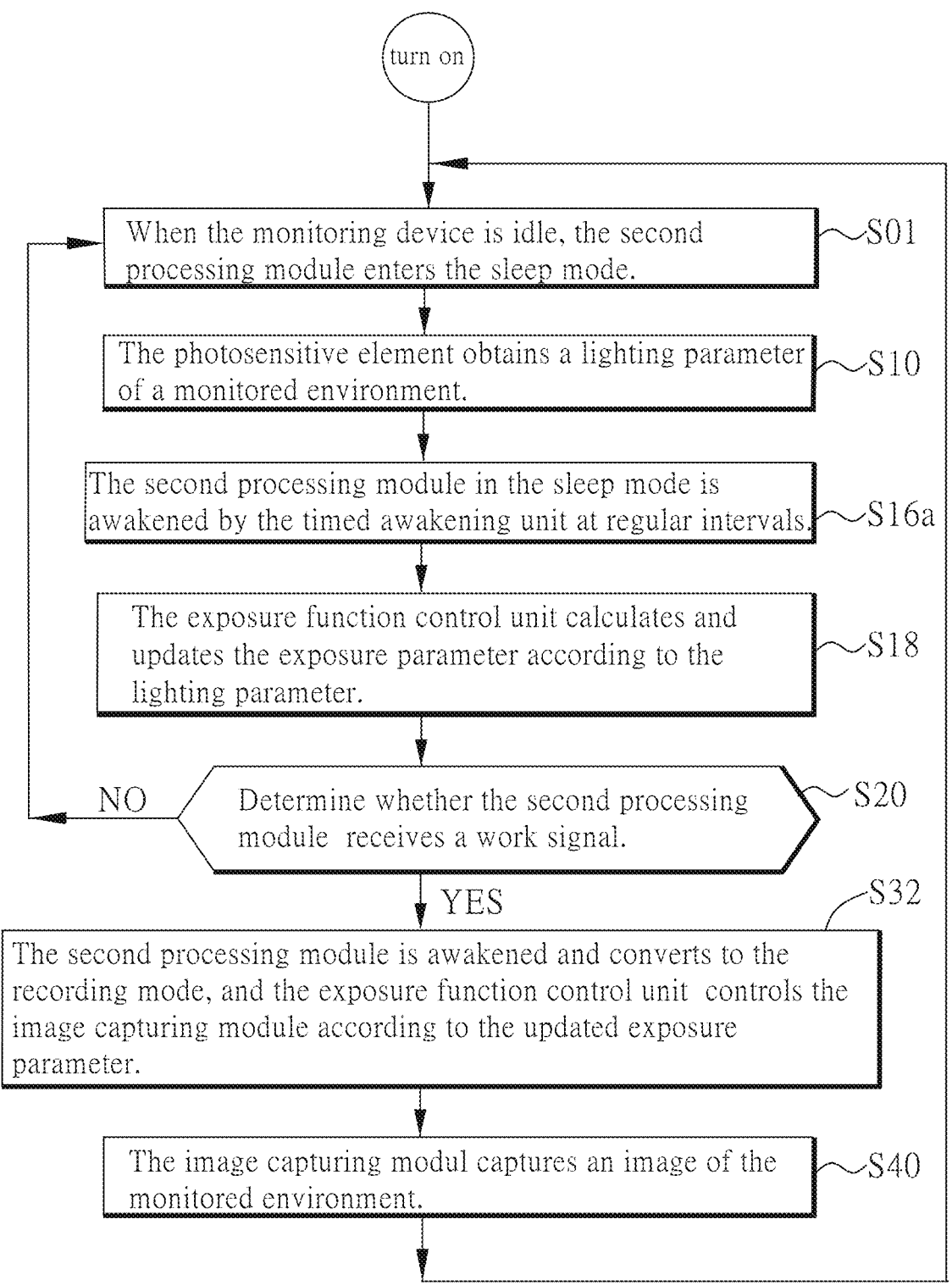
FIG. 5 is a flow chart of an image capturing method according to a third embodiment of the present disclosure.

FIG. 4 is a block diagram of a monitoring device according to a second embodiment of the present disclosure, and FIG. 5 is a flow chart of an image capturing method according to a third embodiment of the present disclosure. In this embodiment, the monitoring device 1*a* comprises an image capturing module 10*a*, a photosensitive element 20*a* and a second processing module 40*a*, and the second processing module 40*a* is electrically connected to the photosensitive element 20*a* and the image capturing module 10*a*. The second processing module 40*a* also has a sleep mode and comprises an exposure function control unit 41a and a timed awakening unit 42a. It should be noted that the image capturing module 10a, the photosensitive element 20a and the second processing module 40a of the third embodiment are the same as the image capturing module 10, photosensitive element 20 and second processing module 40 of the first embodiment, respectively. Different labels are used due to the different connections, and the details are provided in the description of the first embodiment. Further, the monitoring device 1a of this embodiment also comprises a first processing module 30a and an awakening module 50a. The first processing module 30a is an uninterrupted component and is electrically connected to the second processing module 40a but not to the photosensitive element 20a. The photosensitive element 20a of this embodiment is electrically connected to the second processing module 40a.

The image capturing method of the third embodiment comprises the following steps: when the monitoring device 1a is idle, the second processing module 40a enters the sleep mode (step S01); the photosensitive element 20a obtains a lighting parameter of a monitored environment (step S10); the second processing module 40a in the sleep mode is awakened by the timed awakening unit 42a at regular intervals (step S16a); the exposure function control unit 41a calculates and updates the exposure parameter according to the lighting parameter (step S18): second processing module 40a determines whether the second processing module 40a receives a work signal (step S20); if NO, the method returns to step S01; if YES, the second processing module 40a is awakened and converted to a recording mode: the exposure function control unit 41a controls the image capturing module 10a according to the updated exposure parameter (step S32); and the image capturing module 10a captures an image of the monitored environment (step S40).

Specifically, the photosensitive element 20a also obtains the lighting parameter of the monitored environment (step S10). In this embodiment, the second processing module 40a has a timed awakening unit 42a, and the second processing module 40a in the sleep mode is awakened by the timed awakening unit 42a at regular intervals (i.e. after every predetermined duration, such as every 1 minute) (step S16a). In other words, step S16a of this embodiment is a combination steps S14 and S16 of the second embodiment. Since the second processing module 40a is electrically connected to the photosensitive element 20a, then when the second processing module 40a is awakened by the timed awakening unit 42a, the second processing module 40a can receive the lighting parameter directly from the photosensitive element 20a. In some embodiments, when the second processing module 40a is awakened by the timed awakening unit 42a, the second processing module 40a causes the photosensitive element 20a to detect the amount of light in the monitored environment to obtain a lighting parameter. Then the exposure function control unit 41a calculates and updates the exposure parameter according to the lighting parameter (step S18). In other words, the second processing module 40a is periodically awakened and calculates a new exposure parameter to update (replace) the current (old) exposure parameter.

Similarly, the awakening module 50a is electrically connected to the processing module 40a, and the second processing module 40a determines whether a work signal is received (step S20). If the second processing module 40a receives a work signal (an external trigger) from the awakening module 50a, the method proceeds to step S32, and the second processing module 40a is converted to the recording mode.

In step S32, the exposure function control unit 41a controls the image capturing module 10a according to the updated exposure parameter. For instance, the image capturing module 10a may be controlled by adjusting the aperture, shutter, or exposure time, to obtain an image with a proper exposure value (step S40).

In this embodiment, even when the second processing module 40a is in the sleep mode, the second processing module 40a is still periodically awakened by the timed awakening unit 42a such that the exposure function control unit 41a is able to update the exposure parameter periodically. When the second processing module 40a is awakened by an external signal (that is, the second processing module 40a receives a work signal rather than being awakened by the timed awakening unit 42a), the second processing module 40a can use the updated exposure parameter to control the image capturing module 10a. Therefore, the image capturing module 10a is able to obtain an appropriate image, that is, an image with proper brightness, without a delay.

As described above, according to the monitoring devices and the image capturing methods of the present disclosure, when the second processing module is in the sleep mode, then since the first processing module is electrically connected to the photosensitive element, the lighting parameter can be continuously updated by the first processing module. When the second processing module is awakened by an external trigger, it can directly use the updated lighting parameter to calculate the exposure parameter such that the image capturing module can obtain a proper image without a delay. Alternatively, the second processing module in the sleep mode is periodically awakened to update the exposure parameter. Therefore, when the second processing module is awakened by an external trigger, the updated exposure parameter can be directly used, which also allows the image capturing module to obtain a proper image without a delay.

It should be noted that the described embodiments are only for illustrative and exemplary purposes and that various changes and modifications may be made to the described embodiments without departing from the scope of the application as disposed by the appended claims.

What is claimed is:

1. A monitoring device, comprising:
an image capturing module;
a photosensitive element, for obtaining a lighting parameter of a monitored environment;
a first processing module, electrically connected to the photosensitive element, for receiving the lighting parameter from the photosensitive element and storing the lighting parameter, wherein the first processing module receives the latest lighting parameter to replace the stored lighting parameter to continuously update the lighting parameter at regular intervals; and
a second processing module, electrically connected to the image capturing module and the first processing module, the second processing module having a sleep mode, wherein after the second processing module enters the sleep mode, the first processing module still continuously updates the lighting parameter, and the second processing module comprising:
an automatic exposure controller, wherein when the second processing module is awakened and converted to a recording mode, the automatic exposure controller receives the updated lighting parameter from the first processing module and calculates an exposure parameter according to the updated lighting parameter to control the image capturing module.

2. The monitoring device as claimed in claim 1, further comprising:
an awakening module, electrically connected to the second processing module, the awakening module transmitting a work signal to the second processing module so that the second processing module is converted to the recording mode and the image capturing module captures an image of the monitored environment.

3. The monitoring device as claimed in claim 2, wherein the awakening module comprises a wireless communication module or a motion sensor.

4. The monitoring device as claimed in claim 1, wherein the second processing module in the sleep mode is awakened at regular intervals so that the automatic exposure controller can calculate and update the exposure parameter according to the lighting parameter.

5. The monitoring device as claimed in claim 4, wherein when the second processing module is awakened and converted to a recording mode, the automatic exposure controller controls the image capturing module according to the updated exposure parameter.

6. An image capturing method, applied in a monitoring device comprising an image capturing module, a photosensitive element, a first processing module and a second processing module, wherein the second processing module has a sleep mode and comprises an automatic exposure controller, and the image capturing method comprises the following steps:
the photosensitive element obtaining a lighting parameter of a monitored environment;
the first processing module storing the lighting parameter and continuously updating the lighting parameter at regular intervals by replacing the stored lighting parameter with the latest lighting parameter, wherein after the second processing module enters the sleep mode, the first processing module still continuously updates the lighting parameter; and
the second processing module being awakened and converted to a recording mode, and the automatic exposure controller receiving the updated lighting parameter from the first processing module and calculating an exposure parameter according to the lighting parameter to control the image capturing module.

7. The image capturing method as claimed in claim 6, wherein the monitoring device further comprises an awakening module transmitting a work signal to the second processing module to convert the second processing module to the recording mode, the image capturing method further comprising the following step:
the image capturing module capturing an image of the monitored environment.

8. The image capturing method as claimed in claim 6, further comprising the following steps:
the second processing module in the sleep mode being awakened at regular intervals; and
the automatic exposure controller calculating and updating the exposure parameter according to the lighting parameter.

9. The image capturing method as claimed in claim 8, wherein when the second processing module is awakened and converted to a recording mode, the image capturing method comprises the following step:
the automatic exposure controller controlling the image capturing module according to the updated exposure parameter.

* * * * *